United States Patent [19]
Percebois et al.

[11] Patent Number: 5,645,285
[45] Date of Patent: Jul. 8, 1997

[54] ELECTRICALLY INSULATING LOCKING INSERT FOR A SEAL, CORRESPONDING SEAL, AND METHOD OF MANUFACTURING SUCH INSERTS

[75] Inventors: Alain Percebois, Blenod-les-Pont-a-Mousson; Daniel Auproux, Foug; Philippe Renard, Vandoeuvre-les-Nancy, all of France

[73] Assignee: Pont-A-Mousson S.A., Nancy, France

[21] Appl. No.: 397,242
[22] PCT Filed: Jul. 15, 1994
[86] PCT No.: PCT/FR94/00885
 § 371 Date: Mar. 20, 1995
 § 102(e) Date: Mar. 20, 1995
[87] PCT Pub. No.: WO95/03507
 PCT Pub. Date: Feb. 2, 1995

[30] Foreign Application Priority Data

Jul. 23, 1993 [FR] France ................ 93 09133

[51] Int. Cl.⁶ ............... F16L 37/084; F16L 25/02; F16L 21/03; F16J 15/46
[52] U.S. Cl. ............ 277/207 A; 277/189; 277/901; 277/233; 285/48; 285/50; 285/104; 285/105; 156/89; 65/59.1; 65/59.5; 65/59.4; 65/43
[58] Field of Search ............... 277/901, 207 A, 277/233, 189; 285/48, 50, 104, 105; 156/89; 65/59.1, 59.4, 59.5, 43

[56] References Cited

U.S. PATENT DOCUMENTS

| | | | |
|---|---|---|---|
| 2,127,694 | 8/1938 | Miller | 285/50 |
| 2,771,969 | 11/1956 | Brownolw | 156/89 |
| 3,175,937 | 3/1965 | Bayer et al. | 156/89 |
| 3,204,989 | 9/1965 | Wilson | 285/50 |
| 3,284,891 | 11/1966 | Whitney | 156/89 |
| 3,676,292 | 7/1972 | Pryor et al. | 156/89 |
| 3,697,823 | 10/1972 | Correll | 317/230 |
| 4,251,595 | 2/1981 | Dumesnil et al. | 428/426 |
| 4,736,956 | 4/1988 | Yoshijima et al. | 277/233 |
| 4,776,600 | 10/1988 | Kohn | 277/901 |
| 5,197,768 | 3/1993 | Conner | 285/105 |
| 5,248,751 | 9/1993 | Takahashi et al. | 528/15 |

FOREIGN PATENT DOCUMENTS

| | | | |
|---|---|---|---|
| 073484 | 3/1983 | European Pat. Off. | 285/48 |
| 0552123 | 7/1993 | European Pat. Off. | |
| 2679622 | 1/1993 | France. | |
| 2754984 | 6/1979 | Germany. | |
| 3405988 | 8/1985 | Germany. | |

OTHER PUBLICATIONS

*Introduction to Materials Science for Engineers*, Shackelford, James, F., MacMillan Publishing Co., New York, 1985, p. 235.

*Primary Examiner*—William A. Cuchlinski, Jr.
*Assistant Examiner*—Christina Annick
*Attorney, Agent, or Firm*—Sughrue, Mion, Zinn, Macpeak & Seas

[57] ABSTRACT

A locking insert 4 for joining the male and female ends of spheroidal-graphite cast-iron pipes conveying fluids under pressure has a generally planar shape, and includes at least two metal parts 4A, 4B fixed to each other by an electrically insulating junction layer 4C.

14 Claims, 2 Drawing Sheets

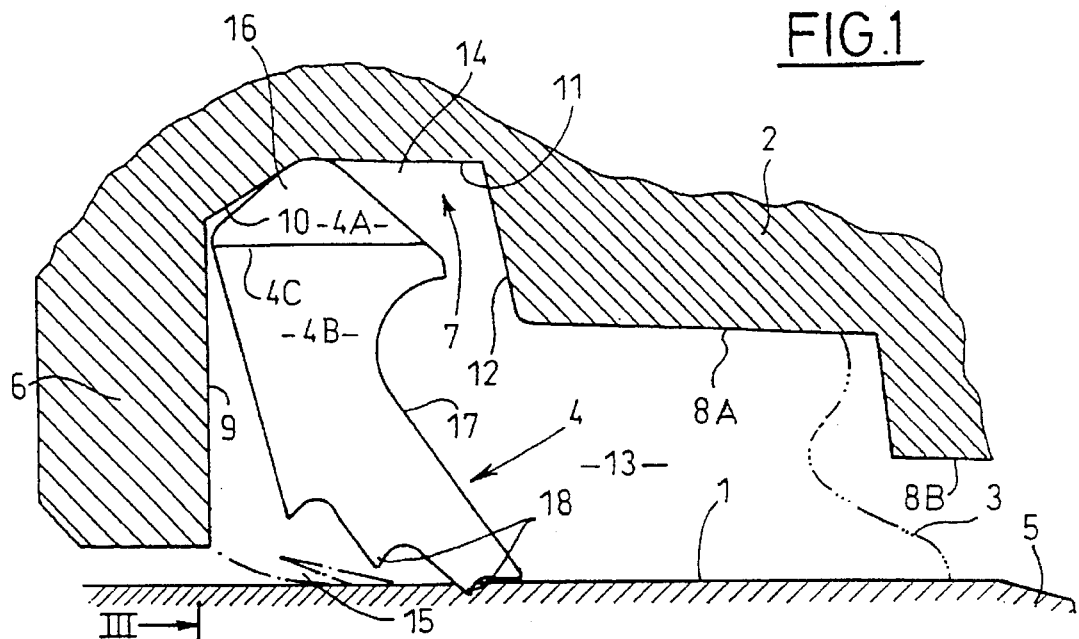
FIG.1
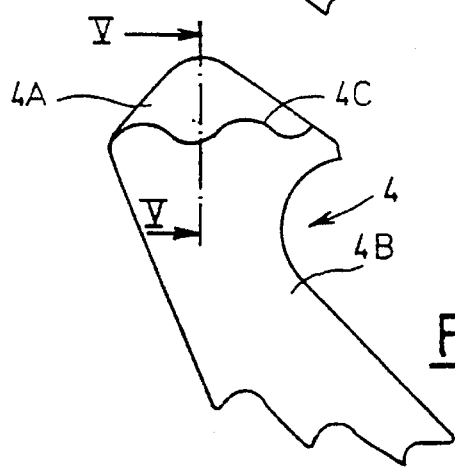
FIG.2
FIG.3
FIG.4
FIG.5

ELECTRICALLY INSULATING LOCKING INSERT FOR A SEAL, CORRESPONDING SEAL, AND METHOD OF MANUFACTURING SUCH INSERTS

BACKGROUND OF THE INVENTION

The present invention relates to locked joints between metal pipes, especially spheroidal-graphite cast-iron pipes.

The joints between such pipes are subjected to separation forces when fluids under pressure are conveyed.

One particularly economical way of locking these joints consists in incorporating, into the seals made of elastomer or other flexible substance, a ring of locking inserts of planar general shape which are contained in radial planes. Where the joints tend to separate, the inserts are braced against appropriate bearing surfaces and thus prevent the pipes from separating. An example of this technique is described in the Assignee's published Patent Application FR-2,679,622.

When the pipes are metallic, it is sometimes necessary, for reasons of safety, to insulate the pipes electrically from each other. Now, the inserts, being metallic, form electrically conducting pathways.

It has been proposed to produce inserts from insulating materials, but this has turned out to lead to expensive and fragile inserts.

It has also been proposed to coat metal inserts with an insulating layer, at least in a region where these inserts bear against the pipes. However, such coatings are in contact with a relatively rough metal surface, are moved frictionally over this surface and are stressed not only in compression but also in shear. As a consequence, they are quickly damaged and removed.

SUMMARY OF THE INVENTION

The object of the invention is to make it possible to ensure, economically, effective and lasting electrical insulation when using seals which include locking inserts.

For this purpose, the subject of the invention is. a locking insert for a seal, of planar general shape, comprising at least two metal parts fixed to each other by means of an electrically insulating junction layer.

Such an insert may include one or more of the following characteristics:

—the junction layer is approximately perpendicular to the thrust axis of the insert;

—the junction layer extends approximately over a cross-section of maximum area of the insert;

—the junction layer consists of a low-creep insulating organic substance simultaneously ensuring the bonding of and the electrical insulation between the two metal parts, the organic substance being unfilled or filled with particles of non-creeping insulating materials;

—the junction layer comprises a fabric, fibrous bed or mat, which is dense and non-creeping, especially made of an inorganic substance, connected on each side to one of the metal parts by means of a bonding layer made of an organic substance;

—the junction layer comprises a non-creeping insulating coating, especially made of an inorganic substance, deposited on one of the metal parts, and a bonding layer, especially made of an organic substance, connecting this coating to the other metal part;

—the junction layer consists of a non-creeping insulating bonding substance, especially of a refractory material such as enamel, connected directly to the facing surfaces of the two metal parts;

—the junction surfaces have, in cross-section, at least in one direction, a non-rectilinear profile, especially a U-shaped, V-shaped or sinuous profile;

—the junction surfaces have a planar or pseudo-planar profile interrupted by facing recesses which are intended to house an insulating member for the relative positioning of the metal parts.

The subjects of the invention are also:

—a seal made of a flexible substance into which is incorporated at least one locking insert as defined hereinabove;

—a method of manufacturing an insert as defined above, this method being characterized in that:

—a mixture of bonding-substance particles with an agglomerating agent is produced;

—the metal parts are produced;

—the metal parts are arranged in their desired relative positions, with a layer of the mixture between them; and —the assembly is raised to a temperature suitable for carrying out both the firing of the mixture and a heat treatment of the metal parts.

In one mode of operation, the said mixture is an aqueous suspension of glass or enamel powder, and the heat treatment is a final quench heat treatment.

BRIEF DESCRIPTION OF THE DRAWINGS

Illustrative embodiments of the invention will now be described with reference to the appended drawings, in which:

FIG. 1 illustrates, in longitudinal section, the locking of a joint between two metal pipes by means of inserts which are in accordance with the invention;

FIG. 2 represents, in elevation, a variant of the insert of FIG. 1;

FIG. 3 is a partial view, taken in cross-section along the line III—III of FIG. 2;

FIG. 4 is a view similar to FIG. 2, but relative to a second insert variant;

FIG. 5 is a partial view, taken in cross-section along the line V—V of FIG. 4;

DETAILED DESCRIPTION OF THE PREFERRED EMBODIMENTS

Figure 10:
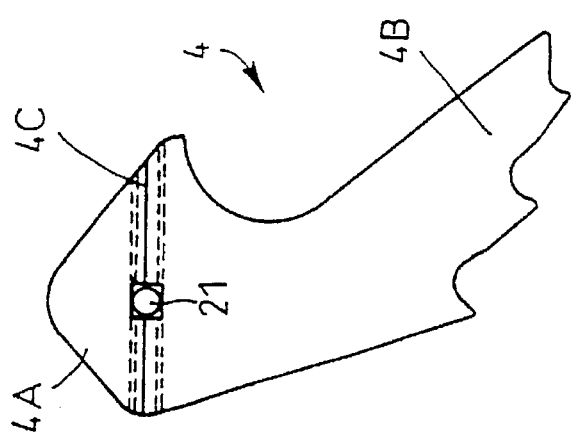
FIGS. 10 and 11 correspond respectively to FIGS. 6 and 7, but for a fifth insert variant.

FIG. 1 shows diagrammatically a joint locked between two identical metal pipes, for example spheroidal-graphite cast-iron pipes, including, at one extremity, a smooth male end 1 and, at the opposite extremity, a fitting part 2 of a female end. The joint is sealed automatically, when the smooth end is pushed right into the fitting part, by radial compression of an annular seal 3 (shown only by the contour of its meridional half-section), and the joint is locked by a ring of inserts 4 which are embedded in this seal. The elements 1 to 3 have the same general axis of revolution, assumed to be horizontal. The smooth end has a cylindrical outer surface, chamfered on the outside, at 5, at its extremity.

Except for the composite structure of the inserts 4, which structure will be described in detail later, the joint may, for the requirements of the present description, be considered as identical to that described in the aforementioned published Patent Application FR-2,679,622. It will therefore be necessary to recall only briefly the other elements of the joint.

The fitting part 2 includes an entry flange 6 and then, in succession, from the rear to the front, that is to say going from this flange to the end wall of the fitting part: a relatively deep anchoring groove 7, a shallower sealing cavity 8A and an even shallower front cavity 8B, freely receiving the extremity of the smooth end 1.

The groove 7 is delimited, in succession, by an approximately radial rear wall 9, an inclined flat 10, an end wall 11 and an approximately radial front wall 12.

The seal 3 is a moulded part made of a flexible or resilient material, for example an elastomer, which comprises, at the front, a solid sealing body 13 and, at the rear, an anchoring heel 14 projecting radially outwards and a lip 15 projecting radially inwards.

Each insert 4 is flat and has a mid-plane passing through the axis of the joint. It has the general shape of an L, with a radially outer head 16 embedded in the heel 14 of the seal and a radially inner tail 17 which converges towards the front until slightly projecting over the radially inner face of the seal, approximately halfway along the latter. The head 16 has a rectangular general shape, as does the tail 17, and the latter is terminated by a series of teeth or projections 18.

In order to assemble the joint, the seal is installed in the fitted part, with its heel in the groove 7, and the smooth end is introduced into the fitting part. This bends back the lip 15 and radially compresses the body of the seal in the cavity 8, and the consequence of the forward inclination of the tail 17 of the inserts is that these inserts do not prevent penetration of the smooth end.

Then, in service, when the pipeline is pressurized, the smooth end is stressed towards the rear, that is to say tends to come apart. The inserts 4 limit this backward movement by being braced between the surfaces 10 and/or 11 of the groove 7, against which surfaces the head 16 bears, and the outer surface of the smooth end, into which surface at least one tooth 18 bites. The joint is thus locked.

Each insert 4 consists of two parts made of quench-hardened steel, namely a radially outer part 4A and a radially inner part 4B, the facing junction surfaces of which are connected by an electrically insulating junction layer 4C.

The layer 4C is designed so as to be subjected to stresses which are minimized and are exerted as far as possible in compression, that is to say so as to prevent shear and/or traction as far as possible, and so as to maintain a reliable electrical insulation between the parts 4A and 4B. Its configuration must, of course, be such that each of the parts 4A and 4B touches but one of the two pipes.

Thus, in the example of FIG. 1, the layer 4C is contained in a plane approximately perpendicular to the thrust axis of the insert and cuts the head 16 of the insert in a cross-section of approximately maximum area of this head.

A first embodiment starts with two parts 4A, 4B which have already undergone an appropriate final heat treatment comprising a heating step and a quenching step.

The junction layer 4C may then have various compositions.

A first embodiment variant consists in producing this layer 4C made of a low-creep insulating organic substance, unfilled or filled with particles of non-creeping insulating materials, such as, for example, inorganic powders, especially ceramics. This layer 4C, applied between the junction surfaces of the parts 4A and 4B, then simultaneously ensures the bonding and electrical insulation of the said parts. This solution has the advantage of being inexpensive and simple to implement; in fact, such a layer 4C may be produced at low temperature and there is thus no risk of the steel, of which the parts 4A and 4B are composed, softening.

A second way of producing a junction layer satisfying, economically, the aforementioned requirements, consists in using as layer 4C an inorganic mat, fibrous bed or fabric, which is dense and non-creeping, for example made of glass fibres or ceramic fibres, this mat, fibrous bed or fabric being impregnated or coated on both its faces with an organic substance such as, for example, a resin. This solution has the advantage of not leading to breakdown of the electrical insulation in the event of the organic resin creeping, the mat, fibrous bed or fabric, then remaining interposed between the junction surfaces of the parts 4A and 4B.

In a third variant, the layer 4C is produced by coating, especially by spraying or evaporation, one of the junction surfaces with a layer of a non-creeping inorganic insulation, such as glass, a ceramic or enamel, and then arranging a bonding layer made of an organic substance, especially an epoxy substance, between this coating and the other junction surface. In this way, the possible heating of the parts 4A and 4B is limited to one of the two junction surfaces and to the adjacent zone of the same part. In addition, the quantity of inorganic insulation deposited is reduced to a minimum, which is economical and guarantees that possible creep, in service, of the organic substance will not lead to a metal/metal contact between the two parts 4A, 4B.

Another method of producing the inserts according to the invention consists, in the same cycle, in generating a homogeneous layer 4C possessing the desired properties, and in quenching the parts 4A and 4B by proceeding as follows.

The two parts 4A and 4B are produced by moulding or machining, and a thick aqueous suspension of glass or enamel powder is made up. Next, the two parts are arranged facing each other, interposing some of the suspension between their junction surfaces. The assembly is then heated to a temperature appropriate both for firing the suspension and for carrying out the quench heat treatment of the steel, without impairing the bonding layer, this temperature typically being of the order of 1000° C.

For all the variants which have just been described, it may be advantageous to shape the junction surfaces of the two parts so that the layer 4C can take up, essentially in compression, forces accidentally moving away from the theoretical thrust or bracing direction. In other words, obstacles are thus created to the sliding of the parts 4A and 4B with respect to each other.

Figure 6:
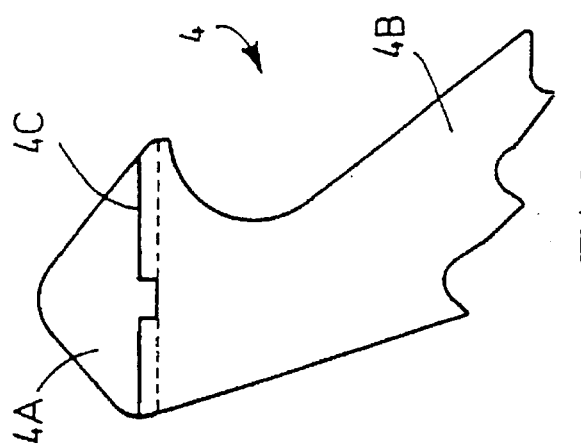
FIG. 6 is a view similar to FIG. 2, but relative to a third insert variant.
Figure 7:
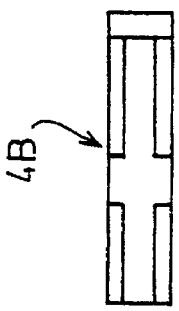
FIG. 7 is a view from above of one of the two metal parts of the insert of FIG. 6.

Thus, in the example of FIGS. 2 and 3, the layer 4C has a V-shaped profile (possibly upside down as shown by the dot/dash lines), both laterally (FIG. 2) and end-wise (FIG. 3), that is to say has a pyramidal shape. Likewise, in the example of FIGS. 4 and 5, the layer 4C has a wavy profile, both laterally (FIG. 4) and end-wise (FIG. 5). In the case of FIGS. 6 and 7, the obstacles to sliding are perpendicular to the general plane of the layer 4C and may, for example, as shown, be constituted by a cruciform relief provided on one junction surface and by a conjugate recess made in the other junction surface.

Figure 8:
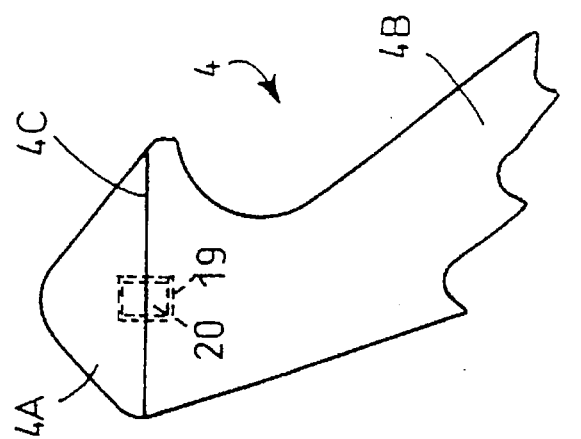
FIGS. 8 and 9 correspond respectively to FIGS. 6 and 7, but for a fourth insert variant.
Figure 9:
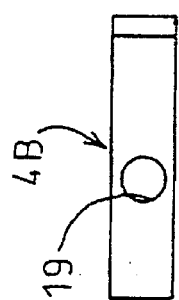

On the other hand, in the example of FIGS. 8 and 9, each junction surface is planar (or, as a variant, pseudo-planar)

and comprises a central cylindrical recess 19 and a pin 20 made of insulating material such as, for example, an inorganic material made of glass, ceramic or asbestos cement, is housed with a little clearance in these two recesses. The remainder of the junction surfaces is covered by the junction layer 4C produced according to one of the variants described above. As a variant, the cavities 19 could have another shape, especially hemispherical, in which case the pin 20 would be replaced by a ball.

Figure 11:
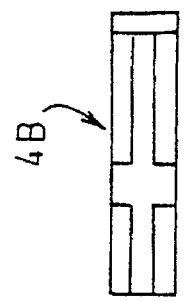

In the example of FIGS. 10 and 11, each junction surface includes a cruciform recess identical to the recess of the part 4B of FIGS. 6 and 7. In order to prevent relative sliding, bars 21, for example cylindrical bars, or alternatively a crosspiece, are used, these being produced from an insulating material and essentially filling the said recesses.

We claim:

1. A pipe joint locking insert (4) embedded in an annular elastomeric seal (3) establishing a coupling joint between male and female ends of pipes carrying fluids under pressure, said insert having a generally planar shape, and comprising two metal parts (4A, 4B) fixed to each other at a junction, and an electrically insulating layer (4C) disposed between the two parts and forming said junction therebetween, wherein an inner end of an innermost metal part of an embedded locking insert is configured to bite into an outer surface of said male pipe end to prevent an axial separation of said coupling joint.

2. The insert according to claim 1, wherein the insulating layer is approximately perpendicular to a thrust axis of the insert.

3. The insert according to claim 1, wherein the insulating layer extends approximately over a cross-section of maximum area of the insert.

4. The insert according to claim 1, wherein the insulating layer comprises a low-creep insulating organic substance simultaneously ensuring the bonding of and the electrical insulation between the two metal parts.

5. The insert according to claim 1, wherein the insulating layer comprises one of a fabric, a fibrous bed and a mat, which is dense and non-creeping, made of an inorganic substance, and connected on opposite sides to the metal parts by a bonding layer made of an organic substance.

6. The insert according to claim 1, wherein the insulating layer comprises a non-creeping insulating coating, made of an inorganic substance, and deposited on a junction surface of one of the metal parts, and a bonding layer, made of an organic substance, connecting said coating to a junction surface of the other metal part.

7. The insert according to claim 1, wherein the insulating layer comprises a non-creeping insulating bonding substance, made of a refractory material, connected directly to facing surfaces of the two metal parts (4A, 4B).

8. The insert according to claim 1, wherein the junction has, in cross-section, in at least one direction, a non-rectilinear profile.

9. The insert according to claim 1, wherein the junction has a profile interrupted by facing recesses (19) for housing an insulating member (20) for the relative positioning of the metal parts.

10. A method of manufacturing a pipe joint locking insert (4) exclusively adapted to be embedded in an annular elastomeric seal (3) for establishing a coupling joint between male and female ends of pipes adapted to carry fluids under pressure, said insert comprising two metal parts (4A, 4B) fixed to each other at an electrically insulating junction, said method comprising the steps of:

a) producing an electrically insulating mixture of bonding-substance particles with an agglomerating agent;

b) producing the metal parts (4A, 4B) without subjecting them to a final quench heat treatment, wherein an inner end of an innermost metal part of an embedded locking insert is configured to bite into an outer surface of a male pipe end to prevent an axial separation of said coupling joint;

c) arranging the metal parts in a desired relative position, with a layer of the mixture between them; and d) raising the arrangement to a temperature suitable for simultaneously carrying out both a firing of the mixture and the final quench heat treatment of the metal parts.

11. The method according to claim 10, wherein the mixture is an aqueous suspension of one of glass and enamel powder.

12. The insert according to claim 4, wherein the organic substance is filled with particles of non-creeping insulating materials.

13. The insert according to claim 8, wherein the profile has one of a U-shape, a V-shape and a sinuous shape.

14. A pipe joint, comprising:

a) a female pipe end, b) a male pipe end disposed within the female pipe end, c) an annular elastomeric seal (3) disposed within the female pipe end and surrounding the male pipe end, and d) a plurality of locking inserts (4) circumferentially spaced around the seal and embedded therein, e) each locking insert having a generally planar shape, and comprising two metal parts (4A, 4B) fixed to each other at a junction, and an electrically insulating layer (4C) disposed between the two parts and forming said junction therebetween, wherein an inner end of an innermost metal part of an embedded locking insert is configured to bite into an outer surface of said male pipe end to prevent an axial separation of said joint.

* * * * *